Patented Dec. 23, 1947

2,433,016

UNITED STATES PATENT OFFICE 2,433,016

PREPARATION OF LONG-CHAIN FATTY ACIDS

Donald D. Coffman, Wilmington, Del., assignor to E. I. du Pont de Nemours & Company, Wilmington, Del., a corporation of Delaware No Drawing. Application March 17, 1945, Serial No. 583,396

12 Claims. (Cl. 260—413)

This invention relates to olefin reactions and particularly to a process for reacting olefins such as ethylene with organic carboxylic acids in the presence of certain specific catalysts to be hereinafter disclosed.

The type of reaction with which this invention is concerned is essentially a polymerization of the olefin in the presence of a reactant, one molecule of which supplies both end groups for the long chain or modified polymeric molecule. For convenience, such a reaction may be referred to as "telomerization" and the modified polymeric products as "telomers." In the copending application of W. E. Hanford and J. R. Roland, S. N. 471,028 filed January 1, 1943, it is disclosed that ethylene undergoes a "telomerization" reaction with various saturated organic oxygen-containing materials in the presence of certain catalysts which are considered to be effective as sources of free radicals, namely, peroxides, persulfates, oxygen, perborates, percarbonates, hydrazines, tetraethyl lead, hexachloroethane and the like. This kind of reaction is, of course, entirely unlike the ordinary esterification of carboxylic acids by reaction with olefins, which occurs in the presence of strongly acidic or metal halide types of catalyst.

An object of this invention is to provide an improved process for reacting ethylene with organic carboxylic acids. Another object is to provide novel catalysts for the introduction of a polyethylene chain into organic carboxylic acids having at least one hydrogen atom attached to an alpha carbon atom.

These and other objects are accomplished in accordance with this invention by heating ethylene with an organic carboxylic acid free of olefinic and acetylenic unsaturation, and having at least one alpha-hydrogen atom, in the presence of a catalyst having a >C=N—group, as for example, derived from an oxo compound (ketaldone), and preferably of the class consisting of azines, oximes, hydrazones, semicarbazones, and Schiff's bases, as hereinafter more fully described. When ethylene is employed as the sole olefinic reactant, the reaction which occurs in accordance with the invention may be written as follows:

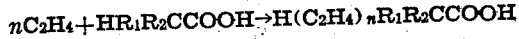

in which $R_1$ and $R_2$ represent hydrogen, monovalent hydrocarbon groups free of olefinic and acetylenic unsaturation, and carboxyl-substituted monovalent hydrocarbon groups free of olefinic and acetylenic unsaturation, and $n$ is an integer, preferably having an average value of from 6 to 50 or more.

It is well known that when a carbonyl compound of the class consisting of aldehydes and ketones is caused to react with an amino compound of the class consisting of hydroxylamines, hydrazines, semicarbazide, aniline (or other amines) and the like, or salts thereof, a derivative is formed in which the carbonyl group is replaced by the group, >C=N—. Derivatives thus obtained constitute a class of substances consisting of azines, oximes, hydrazones, semicarbazones and Schiff's bases. These substances are useful as catalysts in accordance with this invention. Schiff's bases are condensation products of aromatic amines and aldehydes, and are structurally analogous to aliphatic or aromatic derivatives of ketones or aldehydes, said derivatives containing the >C=N—group. The expression, Schiff's bases, as used hereinafter, includes these analogous compounds.

The acids used for reaction with ethylene in this invention may be any of the organic carboxylic acids which contain at least one alpha-hydrogen atom, which are free of olefinic and acetylenic unsaturation, and which preferably contain only carbon, hydrogen and oxygen. More specifically, the acids useful in the practice of this invention include acetic, propionic, butyric, isobutyric, valeric, and higher alkanoic acids containing at least one alpha-hydrogen atom such as octanoic, decanoic, lauric and myristic and even higher acids. Branched-chain carboxylic acids, though less readily available, are of similar utility in this invention if they conform to the definition given above. As such may be mentioned butane-2-carboxylic acid and pentane-3-carboxylic acid. Di- and poly-basic acids may also be used in carrying out the reaction of this invention if they also conform to the limitations set forth above. Suitable examples of such acids are succinic, glutaric, adipic, sebacic, and tricarballylic acids. In view of the greater ease of availability, it is generally preferred to practice this invention with the lower molecular weight acids described, particularly with those which contain less than 7 carbon atoms.

The reaction of ethylene and organic carboxylic acids according to this invention is sensitive to impurities or inhibitors, and it is therefore especially desirable that carefully purified acids be employed.

The ratios of ethylene to carboxylic acid in the initial reaction mixture may be varied widely.

The preferred ratios in batchwise operation are from about 1:8 to about 1:1.12 by weight, although still wider ratios of reactants, including the range from about 1:30 to about 1:0.1, are operable. In a continuous process virtually any ratio of reactants may be employed. Control of the ratio of reactants is important since it affects the average molecular weight of the product. While minor amounts of acids containing only one combined ethylene unit per molecule of the initial carboxylic acid are sometimes present in the products, in most instances the product is made up of acids containing a larger number of combined ethylene units.

The carboxylic acid reactant is preferably used in the absence of solvents or diluents. However, a diluent or solvent may be used, in which case it is preferable to employ materials which do not themselves react with ethylene. For this purpose materials which are free of secondary and tertiary hydrogen atoms are preferred, such as tert.-butyl methyl ether, methyl pivalate, benzene, and chlorobenzene. Highly-branched and sterically-hindered compounds, even if they contain secondary or tertiary hydrogens, may also be used. Isooctane, pentamethylethane, etc. are such compounds.

This reaction can be applier to any polmerizable mono-olefinic hydrocarbon preferably one containing less than five carbon atoms. Ethylene is the preferred olefin for use in the practice of this invention and should be the major component of olefinic gas used in the practice thereof. The ethylene may contain small quantities of ethane, propane, nitrogen, hydrogen, carbon dioxide or oxygen. Oxygen in high concentrations, for example, in excess of 1000 parts per million is generally deleterious to the reaction. Ethylene containing smaller amounts of oxygen, however, e. g. less than 100 P. P. M. (generally less than 50 P. P. M. and the preferably less than 10 P. P. M.), is employed since these concentrations have only minor effects on the yields and molecular weights of the products produced. Commercial grades of ethylene frequently contain various impurities, and it is generally desirable to purify the ethylene to attain low concentrations of all contaminants, particularly oxygen and acetylene. Ethylene is conveniently purified by distillation, by catalytic removal of contaminants, or by scrubbing.

As catalysts for inducing the reaction of this invention, any compound may be used which contains the group >C=N— and which is derived from a ketaldone, i. e., a ketone or an aldehyde. Specific catalysts useful in the practice of this invention include azines (containing the group >C=N—N=C<) such as benzalazine, heptaldazine and diphenylketazine; oximes (containing the group >C=NOH) such as d-camphor oxime, acetone oxime alpha-benzil dioxime, butyraldehyde oxime, alpha-benzoin oxime, dimethylglyoxime; hydrazones (containing the group >C=N—N—) such as benzaldehyde phenylhydrazone, phenylhydrazones of cyclohexanone, cyclopentanone, acetophenone, menthone, camphor, and benzophenone; semicarbazones (containing the group >C=N—NHCONH₂) such as semicarbazones of acetone, methyl ethyl ketone, diethyl ketone, biacetyl, cyclopentanone, cyclohexanone, acetophenone, propiophenone, camphor, and benzophenone; Schiff's bases (containing the group >C=N—) such as benzaniline, benzal-p-toluidine, benzal-o-toluidine, benzaldehyde derivatives of methylamine, ethylamine, and heptylamine, acetaldehyde anil, acetone anil, isobutyraldehyde anil, heptaldehyde anil, etc. These catalysts are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit. For their best utility in the practice of this invention, the foregoing catalysts should be highly purified. For example, some of the phenylhydrazones and some of the Schiff's bases are relatively unstable and decompose on exposure to moisture or air. When the catalysts show such sensitivity they should be freshly prepared immediately before use. Some, such as benzalaniline, can be satisfactorily stored in a vacuum or under a nitrogen atmosphere for a limited period of time.

In the practice of this invention, temperatures of about 50° to 400° C. are generally used, good results being obtained at about 150° to 300° C. In continuous reactors, the preferred temperatures are from 150° to 400° C. depending upon the pressure, the activity of the catalyst, and also upon the contact time.

Superatmospheric pressure is used in carrying out the process of this invention. Pressure and temperature are inversely interdependent variables; that is, within the limits given, high reaction temperatures generally permit the use of lower reaction pressures whereas low reaction temperatures generally require relatively high pressures for a comparable rate of reaction. In order to obtain a high yield, and a high space time yield, the process is generally operated at a pressure of 100 atmospheres to 2000 atmospheres, or even higher. Pressures in the range of 500 to 1500 atmospheres are readily obtained, and are quite satisfactory for most purposes. From the foregoing discussion, in the light of the specific examples, one skilled in the art can readily ascertain optimum or near optimum conditions of temperature and pressure to apply to a chosen system. Other factors being equal, an increase in temperature makes for a decrease in the average molecular weight of the acid product while an increase in ethylene pressure makes for an increase in the average molecular weight.

The equipment used in the practice of this invention may be fabricated of, or lined with, suitable inert materials, such as stainless steel, silver, lead, tin, or glass.

In the following examples, the reaction vessel employed is a high pressure shaker tube of 400 cc. capacity. All parts are given in weight in c. g. s. units unless otherwise stated.

*Example 1.*—A silver-lined high-pressure vessel is charged with 200 parts of isobutyric acid and 0.2 part of benzalazine. The vessel is then closed, placed in a shaker machine, pressured with ethylene and heating and agitation are started. During a reaction time of 14.4 hours throughout which the temperature is maintained at 220° to 226° C. and the pressure at 850 to 950 atmospheres there is a total observed pressure drop of 665 atmospheres. The vessel is then cooled, bled of excess ethylene, opened and the reaction mixture discharged. Distillation of this reaction mixture gives 165 parts of unreacted isobutyric acid 8.7 parts of an acid mixture boiling at 113° to 114° C. at 16 mm. and having an acid number of 349.0, 10.5 parts of an acid mixture boiling at 136° to 181° C. at 6 mm. pressure and having an acid number of 252.2, 12 parts of an acid mixture boiling at 181° to 236° C. at 3 mm. and having an acid mixture of 182.0, 10.5 parts of an acid mixture boiling at 218° to 290° C. at 1.25 mm. and having an acid number of 58. The acids of all of these fractions are saturated, free of neutral contaminants and are readily soluble in organic solvents and in aqueous bases. Aqueous solutions of the alkaline salts foam strongly, wet sulfur and in general show good surface active properties.

*Example 2.*—A silver-lined, pressure-resistant vessel is charged with 200 parts of isobutyric acid and 0.2 part of diphenyl-ketazine. The vessel is then closed, pressured with ethylene and run as described above. During a reaction time of 15.25 hours throughout which the temperature was maintained at 224° to 253° C. and the pressure at 745 to 1000 atmospheres, there is a total observed pressure drop of 1545 atmospheres. The reaction mixture from this experiment yields 145 parts of an acid mixture which has an acid number of 168.5. This analysis corresponds to an average molecular weight of 332 and to an acid mixture containing an average of 21.4 carbon atoms.

*Example 3.*—The experiment of Example 2 is repeated except for the substitution of 0.2 part of d-camphoroxime for the diphenyl-ketazine catalyst. This reaction mixture yields a mixed acid product whose acid number of 196.7 corresponds to an average molecular weight of 285 and to an acid containing an average of 18 carbon atoms.

*Example 4.*—The experiment of Example 1 is repeated except for the substitution of 200 parts of propionic acid for the isobutyric acid of that example. During a reaction time of 14.5 hours throughout which the temperature is maintained at 248° to 252° C. and the pressure at 850 to 1050 atmospheres there is a total observed pressure drop of 885 atmospheres. This reaction mixture yields 60 parts of a soft pasty acid mixture which has an acid number of 135.1. This analysis corresponds to an average molecular weight of 423 and to an acid mixture containing an average of 28 carbon atoms.

*Example 5.*—The experiments tabulated below illustrate the effect of pressure on the reaction of this invention. These runs are carried out by heating 200 parts of isobutyric acid and 0.2 part of benzalazine in a silver-lined reaction vessel at 250° C. and under ethylene pressure in the range given in the table. The table further shows analytical data on the products obtained by reacting these systems at various ethylene pressures.

| Run No. | Pressure, atm. | Yield, Parts | Acid No. | Mol. Wt. | C's in Acid |
|---|---|---|---|---|---|
| 1 | 200–300 | 114 | 408.0 | 137 | 7.5 |
| 2 | 500–600 | 42.8 | 200.4 | 280 | 17.7 |
| 3 | 850–950 | 132.6 | 162.0 | 346 | 22.4 |

*Example 6.*—A series of experiments, tabulated below, shows the effect of temperature on the reaction. Two hundred parts of isobutyric acid and 0.2 part of benzalazine are heated in a silver-lined reaction vessel under ethylene pressure of from 850 to 950 atmospheres at the temperature shown in the table. The table further gives analytical data on the acid mixtures produced from this system.

| Run No. | Temp., °C. | Yield, Parts | Acid No. | Mol. Wt. | Avg. No. C's in Acid |
|---|---|---|---|---|---|
| 4 | 250 | 132.6 | 162.0 | 346 | 22.4 |
| 5 | 265 | 102 | 193.1 | 290 | 18.4 |
| 6 | 275 | 114 | 202.2 | 278 | 17.6 |

*Example 7.*—The experiments listed below were designed to illustrate the influence of reactant ratio on mixed acid products. The amounts of isobutyric acid shown in the table are heated with 0.2 part benzalazine at 250° C. under 850 to 950 atmospheres ethylene pressure. The table also gives analytical data on the acid mixtures obtained under these various conditions.

| Run No. | Isobutyric Acid, Parts | Ethylene,[1] Parts | E/Acid Ratio | Yield, Parts | Acid No. | Mol. Wt. | Avg. No. C's in Acid |
|---|---|---|---|---|---|---|---|
| 7 | 100 | 112 | 1.12 | 97 | 77 | 728 | 49.7 |
| 8 | 200 | 75 | .37 | 132.6 | 162 | 346 | 22.4 |
| 9 | 300 | 37.5 | .125 | 53 | 423.4 | 132 | 7.1 |

[1] These weights of ethylene may be in error by as much as about 5%.

*Example 8.*—Silver-lined pressure-resistant vessels are charged with 200 parts isobutyric acid and 0.2 part of the catalysts listed in the following table. During the reaction, the temperature was maintained at 250° C. and the ethylene pressure at 850 to 950 atmospheres. The table summarizes the yield and analytical data.

| Catalyst | Yield, parts | Conversion (per cent of acid) | Acid No. | Mol. Wt. | Av. No. of Carbon in acid |
|---|---|---|---|---|---|
| Acetone semicarbazone | 45 | 6.5 | 185.8 | 302 | 19.3 |
| Benzaldehyde phenyl-hydrazone | 79.4 | 10.6 | 181.9 | 309 | 19.8 |
| Benzalaniline | 77 | 10.5 | 174.4 | 321 | 20.6 |

The products obtained in accordance with the foregoing examples are mixtures whose components are acids having the structure $$H(CH_2CH_2)_nCR_1R_2COOH$$

where $R_1$ and $R_2$ are members of the group consisting of hydrogen, monovalent hydrocarbon groups free of olefinic and acetylenic unsaturation and carboxyl-substituted monovalent hydrocarbon groups free of olefinic and acetylenic unsaturation, and where $n$ has average values of 6 to 50 or more.

While batchwise operation has been described in the examples, the process of this invention may also be operated continuously. A convenient form of apparatus for use in the continuous process is a long tubular reactor, a portion of which is heated to the reaction temperature. The reactants, including catalyst, separately or mixed in any desired proportion, are pumped through the reactor while the product is continuously removed. In such a reactor the reactants may be preheated or not before being submitted to reaction conditions. If desired, the catalyst may be injected at several points throughout the reaction zone. In this manner, a low and relatively constant catalyst concentration may be used, whereby the reaction velocity is readily amenable to control. Under these conditions the heat of reaction is relatively small in any portion of the reaction zone and is therefore easily removed.

It is generally preferable to maintain all the reactants in intimate contact, which may be accomplished by any method of mixing, such as by continuous stirring, turbulent flow, atomization, etc., or by efficient bubbling of the gaseous phase through the liquid phase of the reaction system.

The products of this invention are widely useful. These acid mixtures, in the form of their sodium or other alkali metal salts, show detergent, emulsifying and wetting properties. The heterogeneity of the products, which is only in respect to molecular weight, makes them superior to many similar materials prepared by other means. For example, water repellents prepared therefrom are useful in the treatment of fabrics, and permit the treated fabric to retain a fine soft hand whereas many similar products confer a hard, boardy character. Moreover, the conversion of these acids to plasticizers and special lubricants, for example by esterification with short-chain alcohols, gives products which remain liquid at very low temperature while many similar products from more conventional sources freeze at relatively high temperatures. The products of this invention can be converted to useful waxes or wax adjuvants, for example by esterification with a long-chain alcohol or glycol, or by preparation of salts such as calcium and other alkaline earth salts as well as aluminum and zinc salts. Such compounds show a wide range of compatibility with other waxes and wax solvents. The alkaline earth and heavy metal salts may further be used as grease-bodying agents, corrosion preventive ingredients and as components of water-repellent and waterproofing compositions. The alkali metal and ammonium salts of these acids are readily soluble in water and such solutions find use in detergent, emulsification, dispersion, wetting, textile dyeing and finishing applications. Many of such soaps are also easily soluble or dispersible in dry cleaning fluids such as naphtha and polychloro compounds and these solutions or dispersions are of value as drying cleaning agents. The synthetic acids obtained by the process of this invention find use per set in the form of salts as compounding ingredients and milling aids in the processing of natural and synthetic rubbers. These also find use as antitack agents in the calendering of plastics. A particularly valuable product, of use as a water repellent, can be prepared from these acid mixtures by conversion, via the amide, to N-hydroxymethylamides. Still other types of water repellents may be made by further reaction of the N-hydroxymethylamide with a tertiary amine salt to give a high grade, permanent water-repellent finish. The long-chain acid mixtures of this invention may also be transformed by known reactions to long-chain acid chlorides, anhydrides, alcohols, sulfates, chlorides, mercaptans, nitriles and amines. The uses for which such secondary products can be manufactured are generally well known to the art. For example, the acid chlorides and anhydrides are directly useful as water-repellent finishes for paper and textiles, the alcohols as wax components and as raw materials for sulfation to hard water detergents, the mercaptans as modifiers for synthetic rubber preparation and vinyl polymerizations in general, the amines as raw materials for cationic surface active agents.

I claim:

1. A process for the preparation of long-chain fatty acids which comprises reacting ethylene with a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, at a temperature within the range of 50° to 400° C. under superatmospheric pressure in the presence of a catalyst of the class consisting of azines, oximes, hydrazones, semicarbazones, and Schiff's bases, whereby a mixture of long-chain fatty acids of the formula $H(CH_2CH_2)_nR_1R_2CCOOH$, $n$ being an integer, is obtained.

2. A process for the preparation of long-chain fatty acids which comprises reacting ethylene with a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, at a temperature within the range of 50° to 400° C. under a pressure of 100 to 2,000 atmospheres in the presence of a catalyst containing a $>C=N-$ group, said catalyst being of the class consisting of azines, oximes, hydrazones, semicarbazones, and Schiff's bases, whereby a mixture of long-chain fatty acids of the formula $$H(CH_2CH_2)_nR_1R_2CCOOH$$

$n$ being an integer, is obtained.

3. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, at a temperature within the range of 50° to 400° C. under a pressure of 100 to 2000 atmospheres in the presence of a catalyst containing the $>C=N-$ group, said catalyst being of the class consisting of azines, oximes, hydrazones, semicarbazones, and Schiff's bases, whereby a mixture of long-chain fatty acids of the formula $$H(CH_2CH_2)_nR_1R_2CCOOH$$

$n$ being an integer, is obtained.

4. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, said carboxylic acid having less than 7 carbon atoms per molecule, at a temperature within the range of 50° to 400° C. under a pressure of 100 to 2000 atmospheres in the presence of a catalyst containing the $>C=N-$ group, said catalyst being of the class consisting of azines, oximes, hydrazones, semicarbazones, and Schiff's bases, whereby a mixture of long-chain fatty acids of the formula $$H(CH_2CH_2)_n R_1R_2CCOOH$$

$n$ being an integer, is obtained.

5. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl substituted monovalent hydrocarbon groups free of olefinic and acetylenic unsaturation, said carboxylic acid having less than 7 carbon atoms per molecule, at a temperature within the range of 150° to 300° C., under a pressure of 100 to 2000 atmospheres, in the presence of a catalyst containing the $>C=N-$ group, said catalyst being of the class consisting of azines, oximes, hydrazones, semicarbazones, and Schiff's bases, whereby a mixture of long-chain fatty acids of the formula $H(CH_2CH_2)_n R_1R_2CCOOH$, $n$ being an integer, is obtained.

6. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, said carboxylic acid having less than 7 carbon atoms per molecule, at a temperature within the range of 150° to 300° C. under a pressure of 100 to 2000 atmospheres, in the presence of an azine catalyst whereby a mixture of long-chain fatty acids of the formula $H(CH_2CH_2)_n R_1R_2CCOOH$, $n$ being an integer, is obtained.

7. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, said carboxylic acid having less than 7 carbon atoms per molecule, at a temperature within the range of 150° to 300° C., under a pressure of 100 to 2000 atmospheres in the presence of an oxime catalyst, whereby a mixture of long-chain fatty acids of the formula $H(CH_2CH_2)_n R_1R_2CCOOH$, $n$ being an integer, is obtained.

8. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent hydrocarbon groups free of olefinic and acetylenic unsaturation, and carboxyl-substituted monovalent hydrocarbon groups free of olefinic and acetylenic unsaturation, said carboxylic acid having less than 7 carbon atoms per molecule, at a temperature within the range of 150° to 300° C., under a pressure of 100 to 2000 atmospheres in the presence of a Schiff's base catalyst, whereby a mixture of long-chain fatty acids of the formula $H(CH_2CH_2)_n R_1R_2CCOOH$, $n$ being an integer, is obtained.

9. A process for the preparation of long-chain fatty acids which comprises reacting 1.0 part by weight of ethylene with 0.1 to 30 parts by weight of isobutyric acid, at a temperature within the range of 150° to 300° C., under a pressure of 100 to 2000 atmospheres, in the presence of a catalyst containing the $>C=N-$ group, said catalyst being of the class consisting of azines, oximes, hydrazones, semicarbazones, and Schiff's bases, whereby a mixture of long-chain fatty acids of the formula $H(CH_2CH_2)_n C(CH_3)_2COOH$, $n$ being an integer from 6 to 50, is produced.

10. A process for the preparation of long-chain fatty acids which comprises reacting 1.0 part by weight of ethylene with 0.1 to 30 parts by weight of propionic acid, at a temperature within the range of 150° to 300° C., under a pressure of 100 to 2000 atmospheres, in the presence of a catalyst containing the $>C=N-$ group, said catalyst being of the class consisting of azines, oximes, hydrazones, semicarbazones, and Schiff's bases, whereby a mixture of long-chain fatty acids of the formula $H(CH_2CH_2)_n CH(CH)_3COOH$, $n$ being an integer from 6 to 50, is produced.

11. A process for the preparation of long-chain fatty acids which comprises reacting ethylene with an alkanoic carboxylic acid having at least one alpha-hydrogen atom, at a temperature within the range of 50° to 400° C. under superatmospheric pressure, in the presence of a catalyst of the class consisting of azines, oximes, hydrazones, semicarbazones, and Schiff's bases, whereby a mixture of long-chain fatty acids is obtained.

12. A process for the preparation of long-chain fatty acids which comprises reacting ethylene with an alkanoic acid having at least one alpha-hydrogen atom at a temperature within the range of 50 to 400° C. under a pressure of 100 to 2000 atmospheres in the presence of a catalyst of the class consisting of azines, oximes, hydrazones, semicarbazones, and Schiff's bases, whereby a mixture of long-chain fatty acids is obtained.

DONALD D. COFFMAN.